350-321
SEARCH ROOM

May 19, 1970 J. L. REYNOLDS ET AL 3,512,879

BANDWIDTH-CODED PHOTOGRAPHIC FILM MEMORY

Filed July 14, 1967 2 Sheets-Sheet 1

INVENTORS
J. L. REYNOLDS
R. S. SCHOOLS
G. T. SINCERBOX
BY Hughes, Rothwell, Mion, Zinn & Macpeak
ATTORNEYS

BANDWIDTH-CODED PHOTOGRAPHIC FILM MEMORY

Filed July 14, 1967

2 Sheets-Sheet 2

3,512,879

BANDWIDTH-CODED PHOTOGRAPHIC FILM MEMORY

Jerry L. Reynolds, Wappingers Falls, Rodman S. Schools, Poughkeepsie, and Glenn T. Sincerbox, Wappingers Falls, N.Y., assignors to International Business Machines Corporation, Armonk, N.Y., a corporation of New York Filed July 14, 1967, Ser. No. 653,573
Int. Cl. G02b *27/00;* G01b *9/02;* G11b *7/00*
U.S. Cl. 350—321 13 Claims

ABSTRACT OF THE DISCLOSURE

A method and means of using interference photography to store binary ones and binary zeros in a Lippmann film by exposing the film to different bandwidths of coherent light in the visible spectrum. To store a one bit, the film is exposed to narrow band light. To store a zero bit, the film is exposed to broad band light. For a multiple bit word, the exposing wavelengths are different for each bit position, and all the bits of a word are stored in the same word area or cell of the film. To read out the stored bits in a cell, the cell is interrogated by a white light beam which is passed through a multi-bandpass interference filter, such as a Fabry-Perot filter, whose passbands are detuned from the peaks of the narrow bands of the exposing light. Consequently, the broad bands of light reflected from the cell will have a greater intensity than the narrow light bands reflected from the cell. A spectroscope and suitable spaced photoelectric devices detect this difference in intensity and produce electric signals corresponding to the bits stored in each cell. A Michelson interferometer and optical spatial filter may be used in place of the spectroscope and interference filter to detect and decode the light reflected from the Lippmann film.

CROSS REFERENCES TO RELATED APPLICATIONS

Pending application Ser. No. 332,755, filed Dec. 23, 1963 describes the characteristic of a Lippmann film or plate and other techniques of interference photography, such as holography and Lippmann holography.

Pending application Ser. No. 285,832, filed June 5, 1963 describes a digital light deflector suitable for scanning the Lippmann film when the scanning light is linearly polarized.

Both of these pending applications are assigned to the assignee of the present application.

BACKGROUND OF THE INVENTION

Field of the invention

This invention pertains to the art of optical storage and retrieval of information utilizing interference photography.

Description of the prior art

In prior art methods and systems utilizing an interference photograph, such as a Lippmann film, for the storage and retrieval of information, a film cell was exposed to different wavelength bands of light to store a one bit and was not exposed to any light to store a zero bit. Retrieval was accomplished by interrogating a cell with a light beam including the exposing wavelengths so that reflected light in an exposing band indicated a one bit, and the lack of reflected light indicated a zero bit.

SUMMARY

By contrast with the prior art, the exposing light in this invention is bandwidth coded. Each word cell of the film is exposed to either narrow band or broad band light for each bit position of a word to be stored. When the film is interrogated by white light filtered into separate narrow bands of wavelengths different from the wavelengths in the exposing narrow bands, the light reflected from the film at the wavelengths of the exposing broad bands will have a greater intensity than the light reflected at the wavelengths of the exposing narrow bands. Suitable light intensity discriminating means decodes the reflected light to identify the bits of a word stored in a cell.

BRIEF DESCRIPTION OF THE DRAWING

In FIG. 1, a light beam 10 from a source 12 of white light is linearly polarized by a polarizer 14 and passed through a converging lens 16 and a shutter 17. Lens 16 focuses the light beam through an electro-optical digital light deflector 18 and onto a desired word cell or area 20 on a Lippmann plate 22. Interposed between shutter 17 and deflector 18 is a rotatable wheel 24 having arranged around the periphery thereof five pairs of interference filters $26_0$, $26_1$; $28_0$, $28_1$; $30_0$, $30_1$; $32_0$, $32_1$; and $34_0$, $34_1$. The bandwidth of the light transmitted by the filters $26_0$, $28_0$, $30_0$, $32_0$, $34_0$ is approximately 150 A. The bandwidth of the filters $26_1$, $28_1$, $30_1$, $32_1$, $34_1$ is approximately 50 A. Five pairs of filters are illustrated since for the example described, five bit words are to be stored in the Lippmann film 22. The bandwidth of the wide band filters will be referred to as $\Delta\lambda_0$ and the bandwidth of the narrow band filters will be referred to as $\Delta\lambda_1$. Each $\Delta\lambda_1$ is included with its corresponding $\Delta\lambda_0$. The bandwidth covered by all the filters will be within a predetermined range of the white light spectrum of 4,000–7,000 A. produced by the source 12, as shown in FIG. 2*a*. The filter pairs $26_0$, $26_1$ will pass wide and narrow bands of wavelengths, respectively, at the lower end of the predetermined range of the spectrum, and the filter pair of $34_0$, $34_1$ will pass wide and narrow bandwidths, respectively, at the upper end of the range. FIG. 2*b* shows the intensity of the exposing light beam 10 plotted as a function of light wavelength for recording the binary word 10110. Deflector 18 is operated to scan beam 10 over all the word cells in film 22. External means may be used to rotate the wheel through one revolution at each cell position. Shutter 17 may be an electro-optical device or mechanical device and is operated to gate beam 10 through the proper filter of each pair of filters in accordance with the binary word being stored.

In an alternative mode of operation, deflector 18 and wheel 24 are coordinated such that the first bits in all word cells are recorded, and then the second bits, etc. In such a mode, wheel 24 is rotated through only one revolution to store all words in film 22; rather than through one revolution per word.

Figure 1:
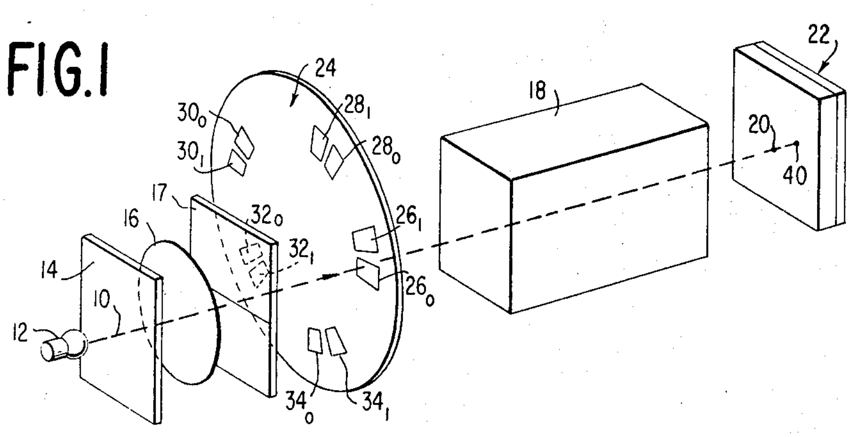
FIG. 1 is a schematic diagram of a preferred system for storing binary information in a Lippmann film.
Figure 3:
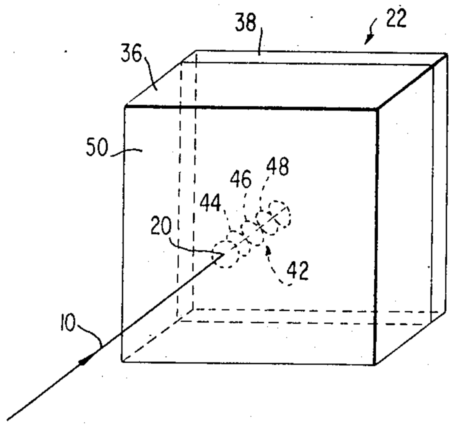
FIG. 3 is an enlarged perspective view of the Lippmann film used in FIG. 1.

The Lippmann plate or film 22 has the characteristic that it will selectively reflect only those wavelengths of light to which it has been exposed in preparing the film. FIG. 3 is an enlarged schematic diagram of the Lippmann film or plate 22 of FIG. 1. The film conisist of a photographic emulsion layer 36 and a reflector layer 38. When the exposing light bean 10 is normally incident on the face of the film 36 at the word cell 20, beam 10 passes through the emulsion 36 and is reflected from the reflector 38 to form, by interference, a standing wave pattern 42 having points of maximum light intensity at antinodes 44, 46, 48, etc. The photochemical action is greatest at these antinodes so that after devolping and fixing, the silver in the developed film forms a system of equidistant layers parallel to the surface 50 of emulsion layer 36 for each wavelength contained in the exposing beam 10. The digital light reflector 18 is controlled to direct the linearly polarized beam 10 to different cell positions in the layer 36. The beam may be positioned or caused to scan by other means, such as a mechanism for moving the light source 12 itself.

More details about the characteristics of such a Lippmann film are presented in the pending application Ser. No. 332,755.

Figures 2A, 2B, 2C, 2D, 2E:
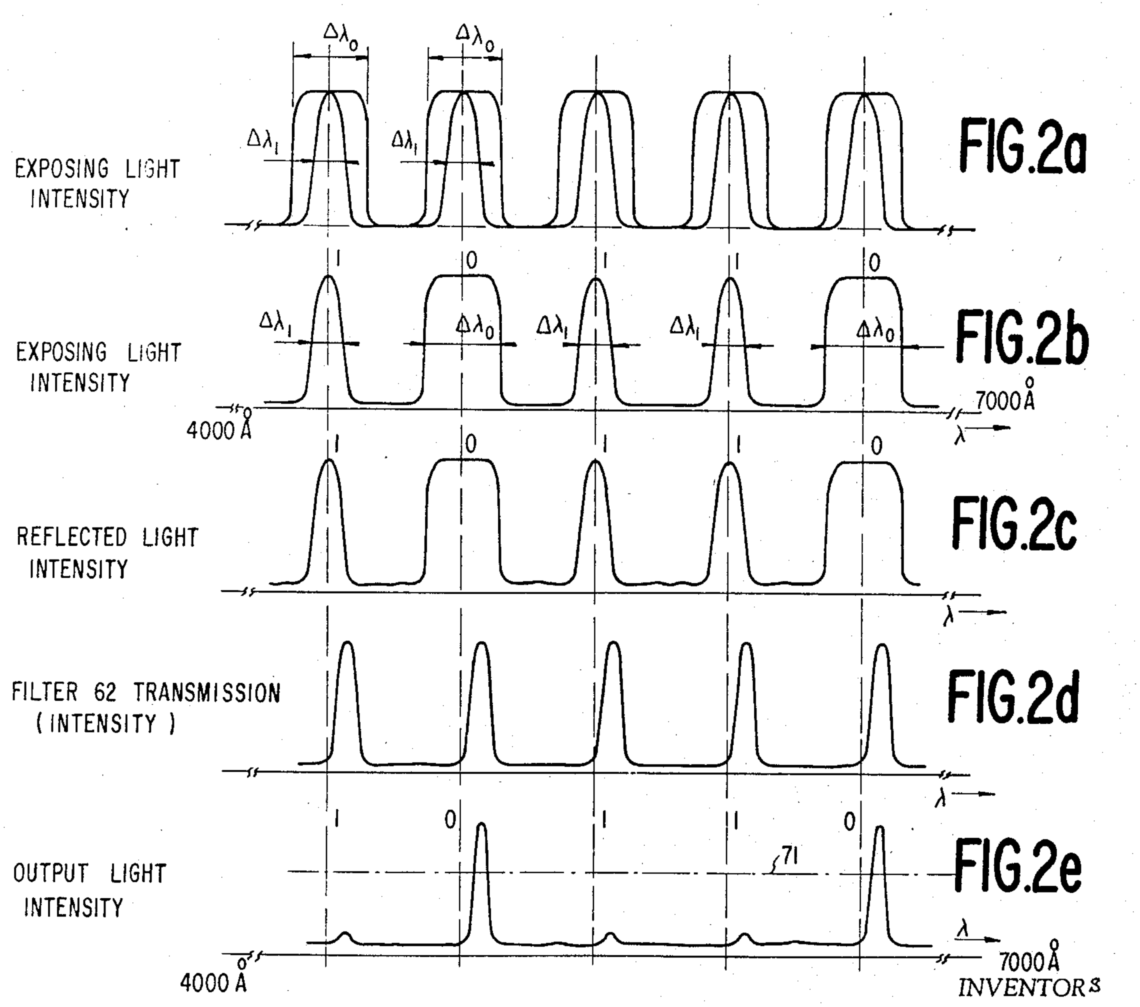
FIGS. 2*a* and 2*b* are plots of exposing light intensity versus wavelength.
FIG. 2*c* is a plot of the intensity of light reflected from the film as a function of wavelength.
FIG. 2*d* is a plot of transmitted light intensity versus wavelength for a Fabry-Perot filter.
FIG. 2*e* is a plot of system output light intensity versus wavelength.

When the cell 20 is subsequently illuminated normally with white light, the silver layers act as partially reflecting surfaces so that the reflected light is substantially limited to wavelengths contained in the original exposing beam 10. FIG. 2*c* illustrates the intensity of the reflected light for stored word 10110.

Figure 4:
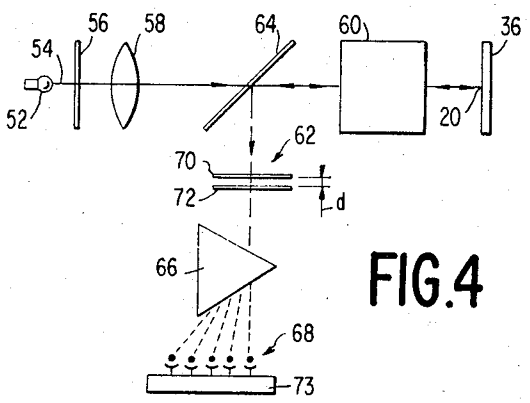
FIG. 4 is a schematic diagram of a preferred system for retrieving information stored in a Lippmann film.

In FIG. 4, there is illustrated a preferred system and method for reading out or retrieving the information stored in the Lippmann film. For readout, the reflecting plate 38 is removed from the emulsion layer or film 36. A source 52 of white light produces a beam 54 which is linearly polarized by a polarizer 56 and passed through a collimating lens 58 and a beam splitter 64 to a digital light deflector 60 which is used to direct the beam to different word cells on the developed Lippmann film layer 36. The output of the deflector is normally incident on the film 36 at the word cell 20. The light is reflected from the silvered layers within the film through deflector 60 and is reflected from beam splitter 64 through a Fabry-Perot multi-bandpass filter 62 which transmits very narrow, separated bands of wavelengths of light. The light passed by the filter 62 passes through a dispersive prism 66 which spatially separates the wavelengths in the reflected light. Five suitably spaced photcells 68 detect the intensity of the light at each of the five bands of wavelengths.

FIG. 2*d* illustrates the transmission characteristics of the Fabry-Perot filter 62. The spikes in FIG. 2*d* indicate the very narrow pass bands of the filter. The filter consists essentially of two partially reflecting films 70 and 72 separted by a distance *d*. The pass bands of the filter are determined by the wavelength and the separation *d*. The filter is designed so that the spikes are detuned from the center frequency of the narrow bands $\Delta\lambda_1$ of the reflected light in FIG. 2*c*. This result may be obtained by choosing the proper separation *d* for the wavelengths involved or else by using a filter with a fixed separation *d* and tilting the filter so that the light beam impinges upon it at an angle rather than normally. Because of this detuning, wavelengths in the narrow pass bands $\Delta\lambda_1$ of the reflected light are blocked or greatly attenuated so that there is no reflected light or very little reflected light intensity in those narrow pass bands. However, the pass bands of the Fabry-Perot filter are chosen to fall within the bandwidths of each of the wide bands $\Delta\lambda_0$. Consequently, the wide bands $\Delta\lambda_0$ of wavelengths corresponding to stored zeros will pass through filter 62 with maximum intensity, but the wavelengths in the narrow pass bands corresponding to stored one's will pass through filter 62 with zero or minimum intensity. The same output light intensity (FIG. 2*e*) is obtained by placing filter 62 between splitter 64 and lens 58 so that each word cell is interrogated only by the pass bands of the filter.

In order to detect the intensities at the different wavelengths of reflected light, the wavelengths must be spatially separated. This separation is accomplished by means of prism 66 disposed in the path between the beam splitter 64 and the five photocells 68. The photocells function to discriminate between high and low intensity reflected light by producing an electrical signal for the zeros corresponding to the high intensity reflection in the $\Delta\lambda_0$ bands, and no output signal for the wavelengths in the narrow $\Delta\lambda_1$ bands. This discrimination may be effected by selecting photocells of proper characteristics or else biasing the photocells by a suitable external circuit to provide a threshold level indicated by the line 71 in FIG. 2*e* so that only signals having an amplitude above this threshold level are transmitted to a suitable utilization device 73, such as a display device, control circuit, computer, etc. Deflector 60 is operated to scan the interrogating beam 54 across film layer 36. The light reflected from layer 36 will follow the same path through deflector 60 as the corresponding interrogating beam.

Figure 5:
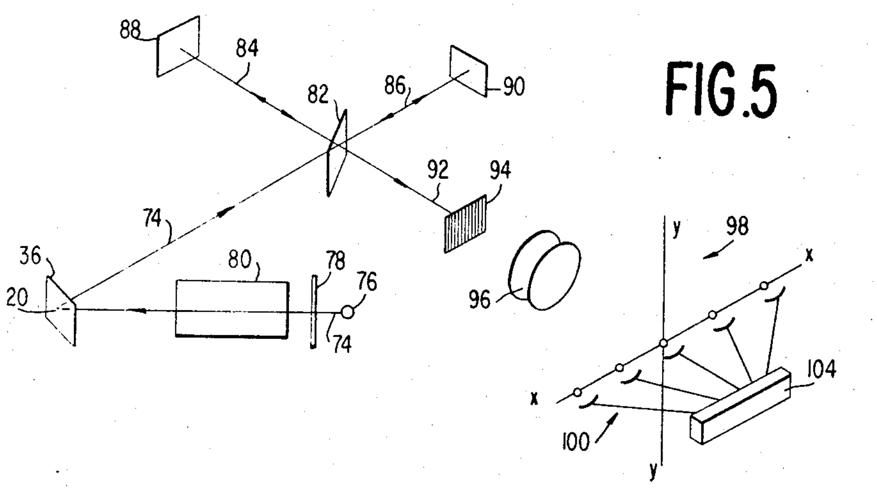
FIG. 5 is a schematic diagram of another system for retrieving information stored in a Lippmann film.

FIG. 5 illustrates another system for retrieving the binary information stored in the film 36. A white light beam 74 from a suitable source 76 is linearly polarized by a polarizer 78 and passed through a digital light deflector 80 to be reflected from the word cell 20 in the film 36. The reflected beam 74 is directed upon a beam splitter 82 and split into two beams 84 and 86 which are reflected from mirrors 88 and 90, respectively, of a Michelson interferometer. The beams 84 and 86 are reflected back to the beam splitter where they are combined into another beam 92 which forms a fringe pattern on a diffusing screen 94 made of ground glass. The visibility or contrast of the fringe pattern formed on the screen 94 depends upon the optical path difference between the two recombined beams and the coherence length (or bandwidth) of the incoming light. If it is assumed that the same binary word 10110 is stored in film 36, each one bit consists of light energy of narrow bandwidth or long coherence length, and each zero bit consists of light of wide bandwidth or short coherence length. Coherence length is described in detail in application Ser. No. 332,775.

The Michelson interferometer is adjusted so that its optical path difference is so large that the visibility of the zero bits is essentially zero but the visibility of the one bits is appreciable. The fringes formed through interference are scattered by the diffusing screen 94 into an optical spatial filter consisting of a frequency analysis lens system 96 and a Fourier or frequency analysis plane 98. If it is assumed that the fringes on the ground glass screen 94 are separated uniformly by a distance D and are of an average wavelength $\lambda$, then a lens system 96 having a focal length *f* positions light energy on the Fourier plane 98 at a point whose distance *x* from the intersection of the *x* and *y* axes of the plane for each band $\Delta\lambda$ is given by the following equation:

$$x=\frac{f\lambda}{D}$$

Coherence length is defined as:

$$l=K\frac{\lambda^2}{\Delta\lambda}$$

Where K is a constant. If it is assumed the average wavelength $\lambda$ is 5000 A., then the coherence length $l_1$ for $\Delta\lambda_1=50$ A. is 0.050 millimeter, and the coherence length $l_0$ for $\Delta\lambda=150$ A. is 0.0167 millimeter. Consequently, the Michelson interferometer is adjusted by relative movement of mirrors 88 and 90 until the optical path difference is greater than $l_0$ and less than $l_1$ for maximum contrast between $\Delta\lambda_0$ and $\Delta\lambda_1$.

Figures 6A, 6B:
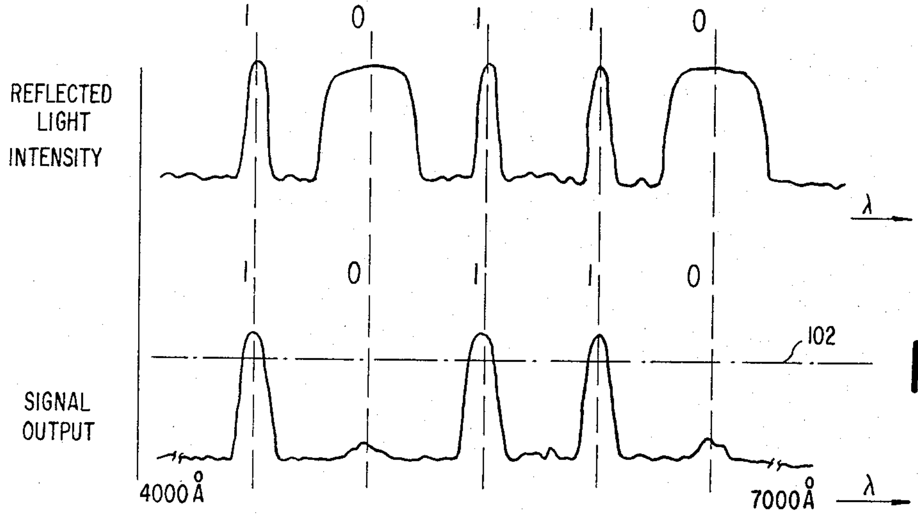
FIG. 6*a* is identical to FIG. 2*c*.
FIG. 6*b* is a plot of system output light intensity as a function of wavelength for the system of FIG. 5.

Five light detectors, such as photocells 100, are placed at each of the points corresponding to the distance $x$ for the known wavelengths of the $\Delta\lambda_0$ and $\Delta\lambda_1$ bands used to expose the Lippmann film. The intensity of the light reflected from film 36 for the word 10110 is shown in FIG. 6*a*. The reflected light intensity pattern at the points along the $x$ axis for the word 10110 is illustrated in FIG. 6*b*. The photocells 100 can be chosen or biased such that they have a threshold level to respond to only bits, thereby discriminating between the wide bands $\Delta\lambda_0$ and the narrow bands $\Delta\lambda_1$. This threshold level is indicated by the line 102 in FIG. 6*b*. The electrical signals from photocells 100 are applied to a utilization device 104.

Even though the foregoing description relates to a preferred embodiment of the invention wherein the Lippmann plate technique is utilized to produce a bandwidth-coded interference pattern within a photographic emulsion, the scope of the invention includes the use of other techniques of interference photography, such as holography and Lippmann holography. A thorough discussion of these techniques is presented in pending application Ser. No. 332,755. The reflector 38 is not required in these latter two techniques.

While the invention has been particularly shown and described with reference to perferred embodiments thereof, it will be understood by those skilled in the art that the foregoing and other changes in form and details may be made therein without departing from the spirit and scope of the invention.

What is claimed is:

1. A method of processing information utilizing a photographic emulsion layer comprising:

(a) producing a first light beam having a relatively wide bandwidth, (b) producing a second light beam having a relatively narrow bandwidth included within said wide bandwidth, and (c) selectively exposing an area of the emulsion layer to said beams in accordance with information to be stored to produce interference patterns which photochemically form within said emulsion layer a plurality of partially reflecting layers corresponding to the wavelengths contained in the exposing beams.

2. The method as defined in claim 1 wherein said information is a binary word consisting of binary ones and binary zeros, and one of said bandwidths corresponds to a binary one and the other of said bandwidths corresponds to a binary zero.

3. The method as defined in claim 2 further comprising:

(a) producing a plurality of said first beams whose bandwidths span a predetermined spectrum, (b) producing a plurality of said second beams within said predetermined spectrum, thereby forming corresponding pairs of wide and narrow bandwidths, and (c) successively exposing said area of the emulsion layer to one or the other of each pair of wide and narrow bandwidths depending upon whether the bit in each binary position of the word is a one or a zero.

4. The method as defined in claim 1 further comprising selectively exposing additional areas of the emulsion layer to said beams in accordance with additional information to be stored.

5. The method of processing information as defined in claim 1 further comprising:

(a) interrogating the exposed emulsion area with a third beam of light including the wavelengths contained in said wide and narrow bandwidths, (b) forming said third beam into separated narrow channels of wavelengths within said predetermined spectrum, each channel corresponding to a different pair of said wide and narrow bandwidths, each channel being located within the corresponding wide bandwidth but in substantial non-alignment with its corresponding narrow bandwidth, and (c) detecting the intensity of light in each of said channels after reflection of said third light beam from said emulsion area to recognize the information stored in said area.

6. An optical information storage system comprising:

(a) an unexposed photographic film, and (b) means for selectively exposing an area of said film to a wide bandwidth of light and a narrow bandwidth of light in accordance with a code representing information to be stored in the film, said narrow bandwidth being included within said wide bandwidth, thereby producing in said film light interference patterns which form in said film partially reflecting layers corresponding to said bandwidths.

7. An optical information storage system as defined in claim 6 further comprising means for selectively exposing a plurality of areas of said film to said bandwidths in accordance with a code representing information to be stored in each of said areas.

8. An optical information storage system as defined in claim 6 wherein said information is a binary word, and one of said bandwidths represents a binary one and the other represents a binary zero.

9. An optical information storage system as defined in claim 8 wherein said binary word contains a plurality of bit positions including a first bit position and a last bit position, each bit position being assigned a different portion of the spectrum of the exposing light with the first bit position being assigned to one end of said spectrum and the last bit position being assigned to the other end of said spectrum, and further comprising means for successively exposing said film area to either a narrow or a wide bandwidth of said light within each of said different portions of said spectrum.

10. An optical information storage system as defined in claim 9 further comprising:

(a) means for generating an interrogating light beam including said spectrum, (b) means for directing said interrogating light beam toward said exposed area, (c) dispersion means placed to intercept light reflected from said area for saptially separating said different portions of said spectrum, (d) a multi-bandpass filter in the optical path of said interrogating beam between said generating means and said dispersion means and having a relatively narrow pass band within each of said different portions of said spectrum, each of said pass bands being substantially within its corresponding wide bandwidth of said exposing light but being in substantial non-alignment with its corresponding narrow bandwidth of said exposing light, and (e) means for detecting the intensity of each of said narrow and wide bandwidths of the light passing through said dispersion means.

11. An optical information storage system as defined in claim 9 further comprising:

(a) means for directing onto said exposed area an interrogating beam including said spectrum of the exposing light, and (b) means for detecting the coherence length of the light in each of said portions of said spectrum of the interrogating beam reflected from said area.

12. An optical information storage system as defined in claim 11 wherein said detecting means comprises:

(a) a Michelson interferometer in the path of the reflected interrogating beam for forming an interference pattern, (b) an optical spatial filter responsive to said pattern to form spaced spots of light whose intensities are related to said narrow and wide bandwidths of exposing light, and (c) means for detecting the intensities of said spots of light.

13. An optical information storage system as defined in claim 6 further comprising:

(a) means for interrogating the exposed area with light including said wide and narrow bandwidths, and (b) means for detecting the intensity of the light reflected in each of said bandwidths from said exposed area.

References Cited

UNITED STATES PATENTS 3,430,212 2/1969 Max et al. -------- 350—150 X

JOHN K. CORBIN, Primary Examiner

U.S. Cl. X.R.

340—173; 350—3.5, 162, 163; 356—106